United States Patent
Lyons et al.

(10) Patent No.: US 7,326,141 B2
(45) Date of Patent: Feb. 5, 2008

(54) COMPACT FAULT TOLERANT VARIABLE CROSS-DRIVE ELECTROMECHANICAL TRANSMISSION

(75) Inventors: Arthur P. Lyons, Maine, NY (US); Bart Winter Mancini, Newark Valley, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 130 days.

(21) Appl. No.: 11/374,630

(22) Filed: Mar. 13, 2006

(65) Prior Publication Data

US 2007/0213160 A1 Sep. 13, 2007

(51) Int. Cl.
*B62D 11/06* (2006.01)

(52) U.S. Cl. .............. 475/28; 475/18; 475/21; 475/116; 475/138; 475/150; 180/6.2; 180/6.28; 180/6.44; 180/6.5; 180/6.7; 180/65.1; 180/65.5; 180/65.6; 180/65.8; 477/1

(58) Field of Classification Search .............. 477/1; 475/18, 21, 28, 138
See application file for complete search history.

(56) References Cited

U.S. PATENT DOCUMENTS

| | | | | |
|---|---|---|---|---|
| 3,503,278 A * | 3/1970 | Livezey | ............ | 74/661 |
| 4,718,508 A | 1/1988 | Tervola | | |
| 4,813,506 A | 3/1989 | Smith | | |
| 5,195,600 A * | 3/1993 | Dorgan | ............ | 180/9.1 |
| 6,342,021 B1 * | 1/2002 | Gleasman et al. | ............ | 475/18 |
| 6,478,706 B1 * | 11/2002 | Crabb | ............ | 475/18 |
| 6,656,074 B2 * | 12/2003 | Andriani | ............ | 475/28 |

OTHER PUBLICATIONS

Merritt, H.E., "The Evolution of a Tank Transmission," p. 412-428.
"Electric Drives for Vehicles Gain Ground," *Jane's International Defense Review*, May 2004.
Naunhelmer, Harald, "Electric Drive Technology for Tracked Vehicles," *Journal of Battlefield Technology*, vol. 1, No. 2, Jul. 1998.

* cited by examiner

*Primary Examiner*—David D. Le
(74) *Attorney, Agent, or Firm*—Scully Scott Murphy & Presser, PC (57) ABSTRACT

A transmission drive system (TDS) has two AC induction traction motors, each operatively coupled to two semi-independent coaxial traction shafts, and two AC induction steer motors coaxially mounted on a common steer axis parallel to the coaxial traction shafts. A steering gear assembly, preferably between the traction and steering motors, has a common steer input shaft operatively connected to the two AC induction steering motors. Two planetary gear sets have the two traction shafts being operatively connected with one of a two planet gear carriers, or two ring gears, respectively. The other of the planet gear carriers or the ring gears are operatively connected with each other. Two offset gears mounted to the steer input shaft and meshing with two sun gears, respectively, including a reversing idler gear interposed between one of the two offset gears and one of the two sun gears.

20 Claims, 11 Drawing Sheets

COMPACT FAULT TOLERANT VARIABLE CROSS-DRIVE ELECTROMECHANICAL TRANSMISSION

BACKGROUND OF THE INVENTION

1. Field of Invention

The invention relates to the field of transportation, and more specifically to a cross-drive transmission particularly applicable for use in differential speed-steered vehicles, particularly track-laying vehicles.

2. Description of Related Art

The use of mechanical cross-drive transmissions employing mechanical, electrical or hydraulic steering devices in tracked and other differential speed-steered vehicles has been known since approximately World War I and World War II. There is currently a growing interest in the art in using cross-drive technology in combination with exclusively electric motors to provide both drive power and steer power, the electric motors being powered by on-board engine-generator set and/or on-board stored electrical energy. Indeed certain arrangements of electro-mechanical cross-drives have been attempted in the art, with certain deficiencies.

Among these deficiencies, the cross-drive transmission architecture is conceived as an arrangement of hardware. Little if any consideration is given to potential for performance improvement, increased reliability, or reduction in lifetime cost of ownership when the drive train is designed to include power electronics, controller(s), and software function. Further, little if any consideration is given to fault tolerance in the transmission architecture.

Traditionally, the axis of rotation of the steer motor is transverse to other major axes in the transmission. The transverse steer axis adds weight and volume as compared to transmission arrangements having parallel axes. Moreover, the transverse steer axis requires the use of opposed meshes of bevel gears. Bevel gear meshes are difficult to align, expensive to manufacture and maintain, and prone to premature wear.

In certain proposed electro-mechanical arrangements, brushless DC motors are used without regard to the potential for short-circuited stator winding failure due to malfunction or due to battle damage. The permanent magnets of brushless DC motors are prone to demagnetization at elevated temperatures. Further, permanent magnet DC brushless motors have significant speed limitations arising from the back EMF inherent with fixed magnetic flux. The only solution is to provide additional windings to oppose the fixed magnetic flux of the permanent magnets at high speed, which adds weight, complexity and opportunity for failure. Finally, multiple independent winding are employed almost without regard to the implications of residual flux coupling that prevent true independent operation.

For at least these reasons, there is a need in the art for an improved electro-mechanical cross-drive transmission arrangement for differential speed-steered vehicles.

BRIEF SUMMARY OF THE INVENTION

In order to address these and other deficiencies in the prior art, provided according to the present invention is a transmission drive system (TDS) for a differential speed steered vehicle, in particular a track-laying vehicle such as a tank or armored personnel carrier, having two AC induction traction motors, each operatively coupled to two semi-independent coaxial traction shafts, and two AC induction steer motors coaxially mounted on a common steer axis parallel to the coaxial traction shafts. A steering gear assembly, preferably between the traction and steering motors, has a common steer input shaft operatively connected to the two AC induction steering motors. Two planetary gear sets have the two traction shafts being operatively connected with one of a two planet gear carriers, or two ring gears, respectively. The other of the planet gear carriers or the ring gears are operatively connected with each other. Two offset gears mounted to the steer input shaft and meshing with two sun gears, respectively, including a reversing idler gear interposed between one of the two offset gears and one of the two sun gears.

Two clutch mechanisms selectively engage the two AC induction traction motors with the two coaxial traction shafts, preferably operative to selectively alter the turning speed of the two coaxial traction shafts relative to the two AC induction traction motors. More preferably, a neutral fault position disengages the first or second AC induction traction motors from the first or second coaxial traction shafts.

Two AC induction pump motors can drive first and second tandem hydraulic pumps, circulating oil through the transmission drive system. The two hydraulic may also derive power from an overrunning clutch driven by motion of the speed steered vehicle, as a backup.

Two semi-independent electronics modules provide power to and control, preferably space vector control, of the two AC induction traction motors and the two AC induction steering motors, respectively, including dual redundant power and control structure. The electronics modules preferably include means for conducting regenerative braking by the first and second AC induction traction motors.

The transmission drive system further includes two mechanical braking subassemblies, hydraulically or manually actuated. The transmission drive system is preferably sealed against the ingress of foreign gas, liquid or particulate, having porting for electrical power and control signals, coolant liquid and mechanical brake actuation.

The transmission drive system delivers output speed and torque to two output couplings, preferably tolerant of misalignment.

BRIEF DESCRIPTION OF THE DRAWINGS

These and other features, benefits, and advantages of the present invention will be made apparent with reference to the following detailed description, appended claims, and accompanying figures, wherein like reference numerals refer to like structures across the several views, and wherein:

DETAILED DESCRIPTION OF THE INVENTION

Figure 1:
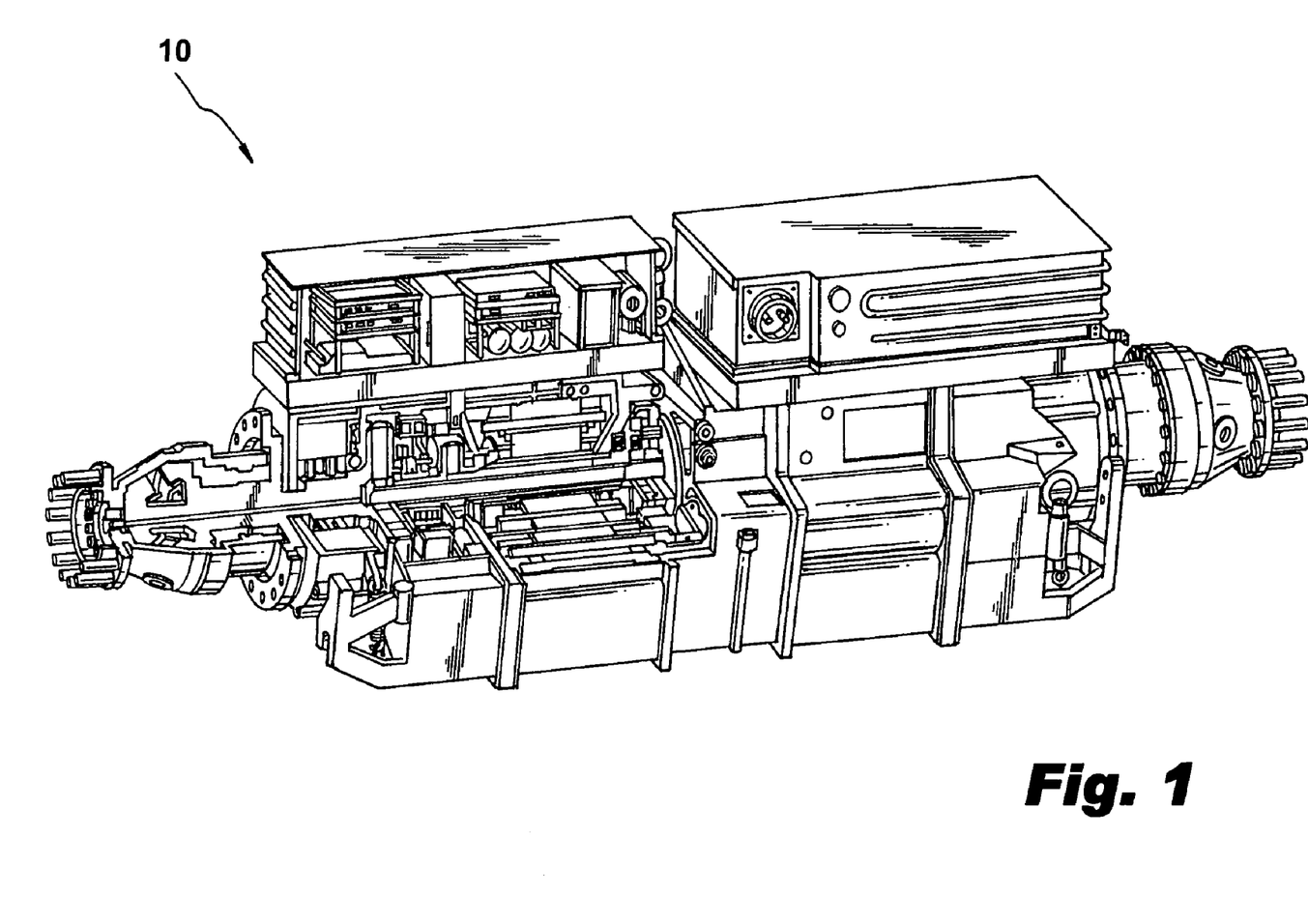
FIG. 1 illustrates a partial cutaway view of a transmission drive system (TDS) according to an exemplary embodiment of the present invention.
Figure 2:
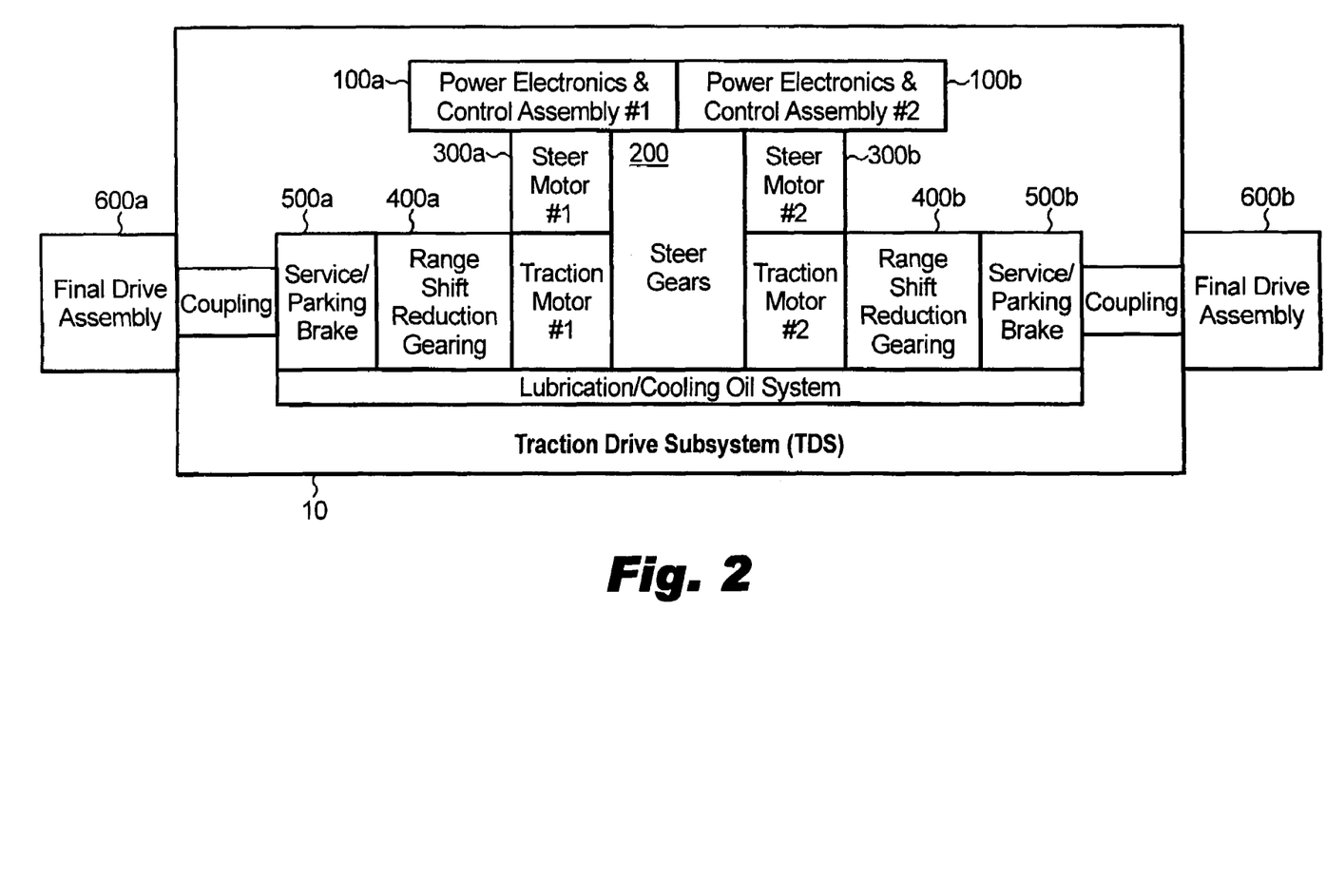
FIG. 2 illustrates a functional block diagram of the TDS as illustrated in FIG. 1, with the subassembly components in their relative spatial positions to one another.
Figure 3:
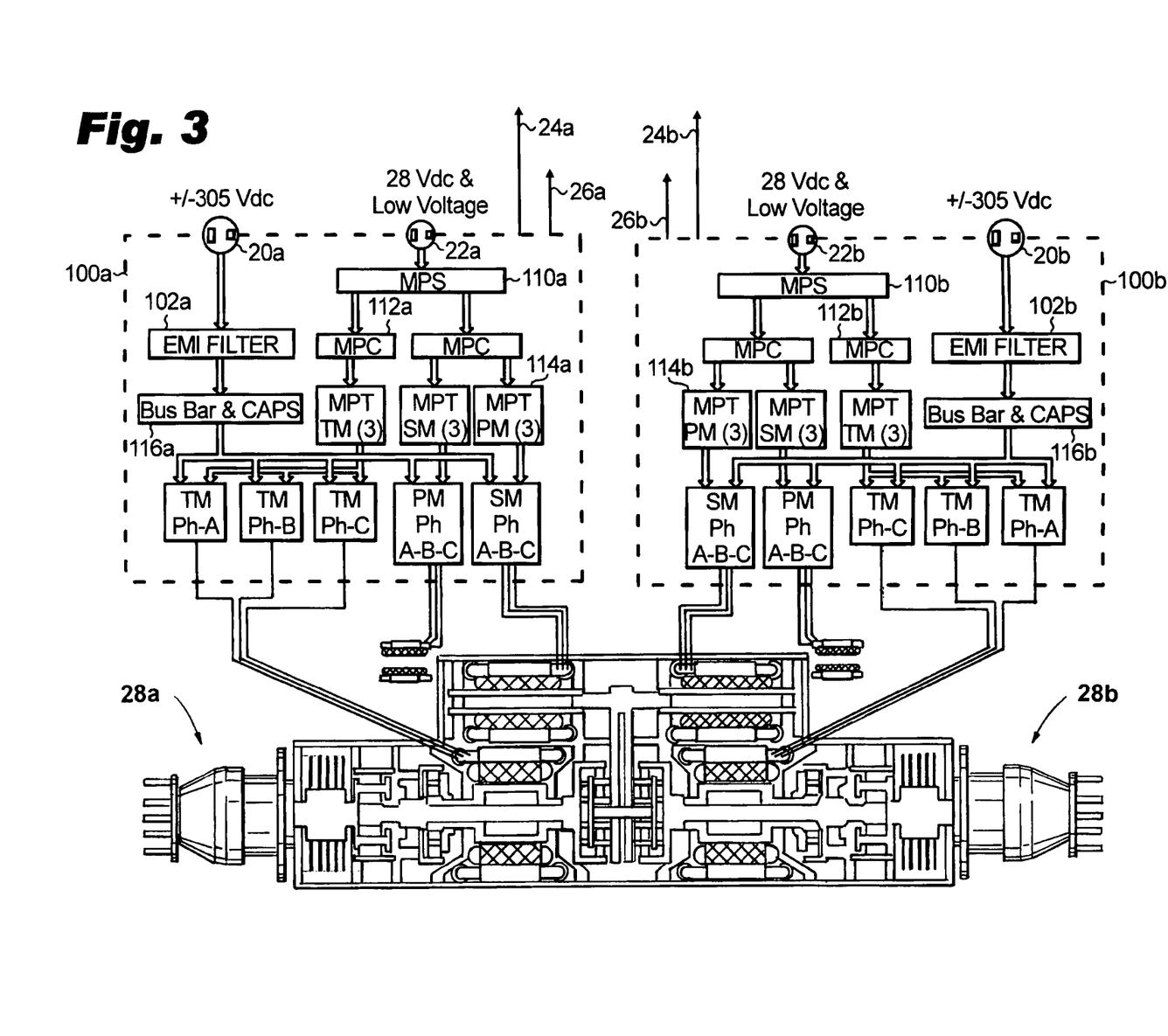
FIG. 3 illustrates a functional diagram of the TDS of FIG. 1, and particularly the Power Electronic Control subassembly thereof.

Referring now to FIG. 1, illustrated in partial cutaway view is a transmission drive system (TDS), generally 10, according to an exemplary embodiment of the present invention. A functional block diagram of the TDS 10 is illustrated in FIG. 2, with the subassembly components in their relative spatial positions to one another. In a preferred embodiment, the TDS 10 is comprised of nine subassemblies, five of which are functionally distinct. The TDS 10 includes two independent Power Electronics Control (PEC) assemblies, 100a, 100b; a single Steer Gear Assembly (SGA) 200; two Motor Housing Assemblies (MHA) 300a, 300b, are positioned on either side of the SGA 200; two Range Shift & Reduction Gear (RSRG) assemblies 400a, 400b are positioned outboard of the MHAs 300a, 300b; and two Service/Parking Brake (SPB) assemblies 500a, 500b are located outboard of the RSRGs 400b, 400b. Hereinafter, where two identical subassemblies are described, for example PECs 100a, 100b, they may be collectively referred to by a single common reference, PEC 100.

The present invention contemplates the use of two Final Drive Assemblies (FDAs) 600a, 600b. FDAs 600a, 600b support a track sprocket in the case of a track-laying vehicle, or wheel hub in the case of a wheeled vehicle, and typically provide final TDS 10 output gear reduction, and additionally often accommodate potential driveline coupling misalignment between the TDS 10 and the FDAs 600a, 600b. However, FDAs 600a, 600b are specific to the vehicle being powered, and preferably if not typically are mounted to and carried by the hull of that vehicle. Accordingly they are not considered part of the TDA 10.

Before describing each subassembly in further detail is it noted that in a preferred embodiment of the present invention, there are limited external connections with the TDS 10. For example, in the exemplary embodiment, the external connections to the TSD 10 include only two each of high-voltage electrical connections 20a, 20b; low voltage electrical connections 22a, 22b, preferably conforming to Military Specification C38999; communication connections 24a, 24b, also preferably MIL-C38999; coolant connections 26a, 26b; output shafts/couplings 28a, 28b; human-powered parking/emergency brake cable interface (See FIG. 8); and a single oil filter connection (not shown), preferably of the threaded spin-on type. In the preferred embodiment, any and all other electrical, mechanical or hydraulic interfaces are internal to the TDS 10. This facilitates reduction in weight and volume, increases protection from damage, and helps to seal the TDS 10 from the effects and transmission of electromagnetic interference (EMI), or contamination by the intrusion of water, chemicals, particulate, or other natural or man-made contaminants.

Figure 5:
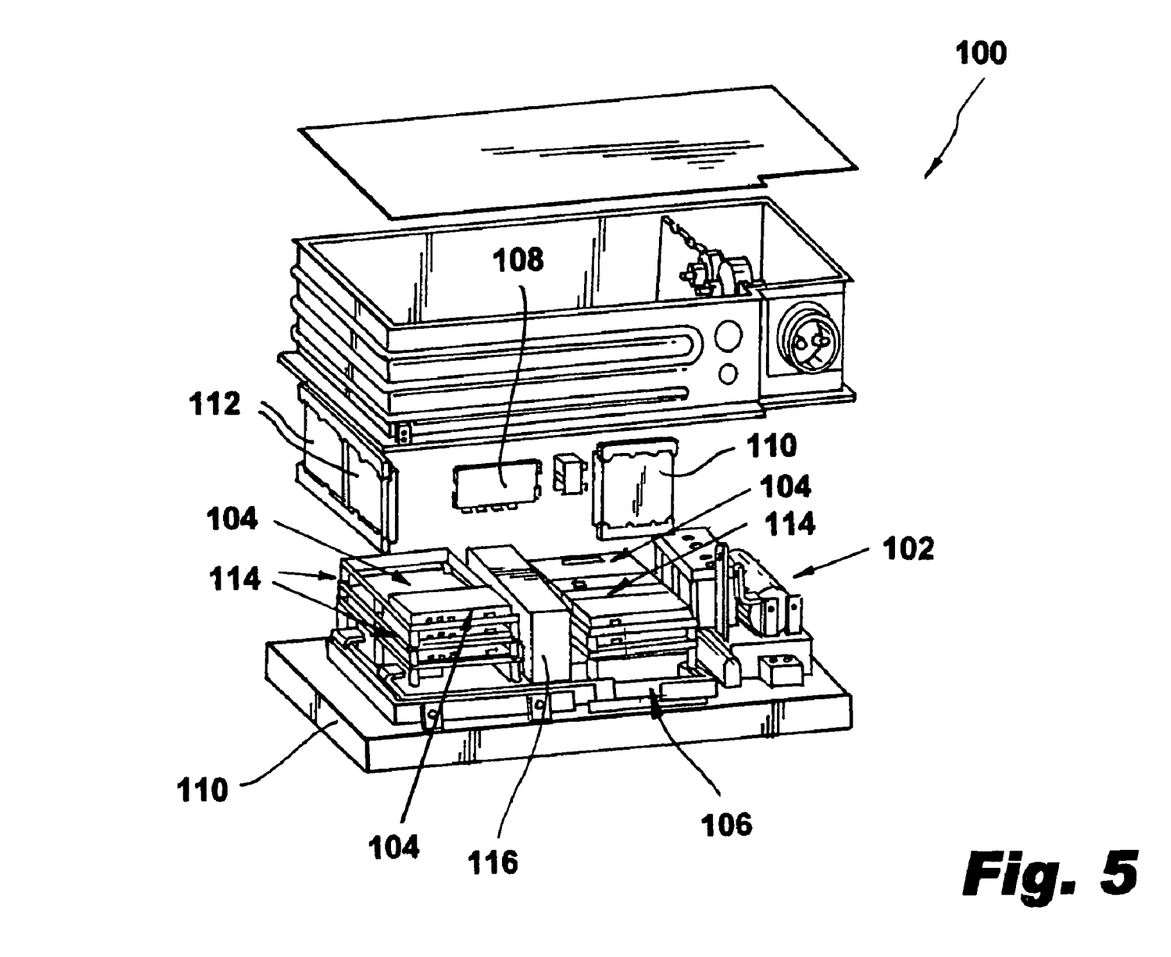
FIG. 5 illustrates an exploded assembly view of a Power Electronic Control subassembly.

Referring now to FIG. 5, illustrated is an exploded assembly view of a PEC 100. Each PEC 100a, 100b, are functionally equivalent mirror-images of one another. The PEC 100 controls and manages the functions of the TDS 10, and the processing of high-voltage electric propulsion power. In the exemplary embodiment, each PEC 100 includes dual independent EMI filters 102, dual independent traction motor inverters 104, dual independent steer motor inverters 106, dual independent coolant pump motor inverters 108, an integrated oil-to-vehicle Propylene Glycol/Water solution (PGW) heat exchanger assembly 110, and redundant system controls and communications.

Each of PECs 100a, 100b are preferably fully electrically and mechanically isolated from one another, with the exception of limited lateral cross-coupling to provide braking control, whether regenerative or frictional, to assist in speed and steering control, as explained, infra. Each PEC 100 includes the following component parts. Three inverters, one AC traction motor inverter 104, preferably rated to at least 300 kW; one AC steering motor inverter 106, preferably rated to at least 110 kW; one AC coolant pump motor inverter 108, preferably rated to at least 5 kW. The PEC 100 includes one independent and isolated high-voltage DC-Link filter, preferably rated to at least 200 kW continuous operation and 300 kW 5-minute operation, intermittent EMI filter 102 compliant with MIL-STD-461 high-voltage bus regulation requirements. The PEC 100 includes Modular Power Management (MPM) Circuit Card Assemblies (CCAs) as follows. One Bias Motor Power Supply (MPS) 110 provides distributed isolated bias power to all PEC CCAs from the from the vehicle 28 VDC power source (i.e., low voltage connection 22). Modular Power Controllers (MPC) 112 provide dual redundant CAN communication I/O, MGV-to-TDS system logic interface control software and firmware; space vector control of AC Traction Motor (ACTM) 302; space vector control of AC Steering Motor (ACSM) 304; variable speed control of AC Pump Motor (ACPM) 206; Built-In-Test (BIT) functionality, diagnostic & prognostic functions based in part on BIT data; actuation of range shift and service brake. Each of nine gate drive Modular Power Trains (MPTs) 114, i.e., one MPT per phase for each of three three-phase inverter output legs, provides isolated high voltage interface and gate drive functions, as well as Analog-to-Digital feedback on current, voltage, temperature and other sensor interfaces for each motor phase leg. Integrated Gate Bi-polar Transistors (IGBT) used in the preferred embodiment of the PEC 100 employ cold-plate heat transfer using vehicle PGW coolant as the working fluid. The foregoing components of PEC 100 are interfaced via bus work 116 and 600 volt nominal DC-link capacitors.

Figure 6:
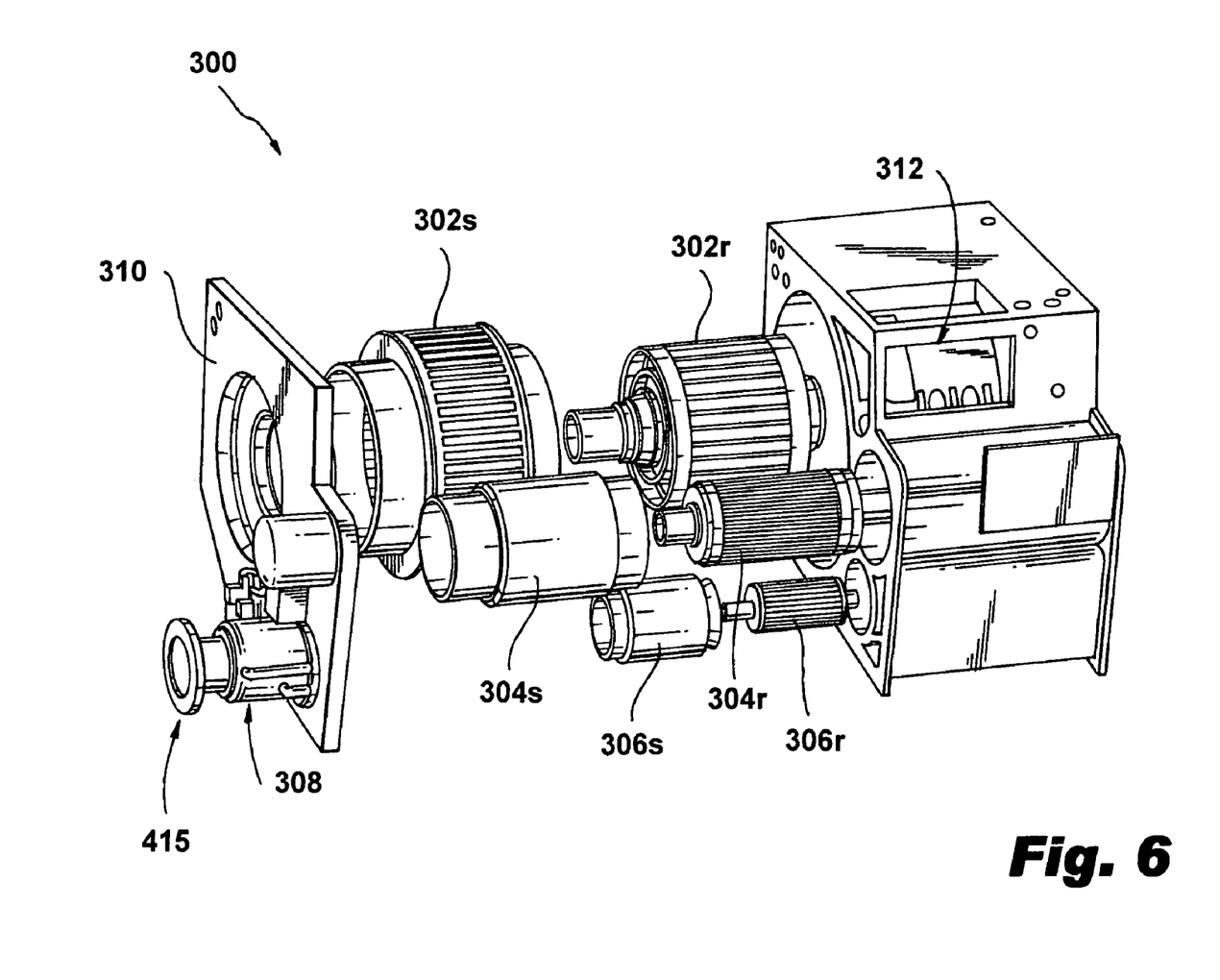
FIG. 6 illustrates an exploded assembly view of a Motor Housing Assembly.

Referring now to FIG. 6, illustrated is an exploded assembly view of a MHA 300. Both MHAs 300 combined preferably provide up to 520 kW traction power and 180 kW steer power at the two FDAs 600 from a common integrated housing, TDA 10. Each MHA includes one AC Traction Motor (ACTM) 302, preferably rated to at least 190 kW continuous output and 260 kW 5-minute output. Shown are the major components of the ACTM 302, the stator 302s, and rotor 302r. The MHA 300 also includes one 90 kW AC Steer Motor (ACSM) 304, shown as stator 304s, and rotor 304r. The MHA 300 also includes one AC Pump Motor (ACPM) 306, preferably rated to at least 5 kW, shown as stator 306s, and rotor 306r. The ACPM 306 drives system coolant pump 308. The MHA 300 is closed on one end by a coolant manifold plate 310, interfacing with the PGW coolant system in the TDS 10 and the host vehicle. The MHA 300 interfaces with PEC 100 at motor phase access ports 312. The AC motors according to the present invention provide superior durability, control, fault tolerance and breadth of efficiency range that are beneficial to the TDS 10 traction and steering applications. Together with PEC 100, they achieve dual independent and redundant control of both ACTM 302 and ACSM 304.

As described in the exemplary embodiment, each ACTM can maintain up to 500 kW regenerative braking for 3-5 minutes, limited only by the thermal time constant of the EMI filter in the associated PEC 100. Preferably, regenerative power of up to 350 kW is continuously available.

Preferred embodiments of ACTM 302 and ACSM 304 operate at a rated 12,000 RPM, providing optimal power density, performance and efficiency. With two MHAs 200a, 200b, the semi-independent ACTMs 202 are able to provide half propulsion power with one ACTM 302 failed. Each ACTM 302 is independently coupled to the TDS cross-shaft through a RGSG 400. Each ACSM 304 is coupled onto a common input shaft to the SGA 200. In a similar fashion to ACTMs 202, two independent ACSMs 204 provide at least half steer performance when one ACSM 304 is failed. Additionally, adequate steering performance remains available with both ACSMs 204 failed, since each ACTM 302 may be operated independently. Approximately half drive performance remains even with one ACTM 302 and one ACSM 304 failed.

The use of AC induction motors according to the present invention is preferred over Permanent Magnet (PM) motors at least because of superior fault tolerance, primarily tolerance of a stator winding short-circuit fault condition. In the event of a stator short, a PM machine will drive full current capability into the short as long as the motor is spinning, because rotor flux is permanent. In addition to the obvious electrical hazards, this generates a large retarding torque the diminishes the authority of the remaining motor in a two-motor arrangement. Consequently, far less than half capacity remains unless the failed motor can be mechanically decoupled from the common shaft. Mechanical decoupling adds to system weight, volume, and complexity, and reduces reliability by adding an additional point of failure. This applies to both the traction motors and the steer motors.

On the other hand, dual AC induction machines are preferable to a single AC induction machine, even having dual independent stator windings (i.e., a physical motor with two halves of its windings driven by independent inverters). Although a single motor with dual independent windings may present reduced size and weight for equivalent motive power generated, the common motor rotor would maintain induced flux for too long a period relative to its speed. Under a single stator short condition with a dual-wound motor, the common rotor maintains its flux from the operational stator portion. This results in a similar impairment of the remaining portion, as in the PM machine.

Figure 4:
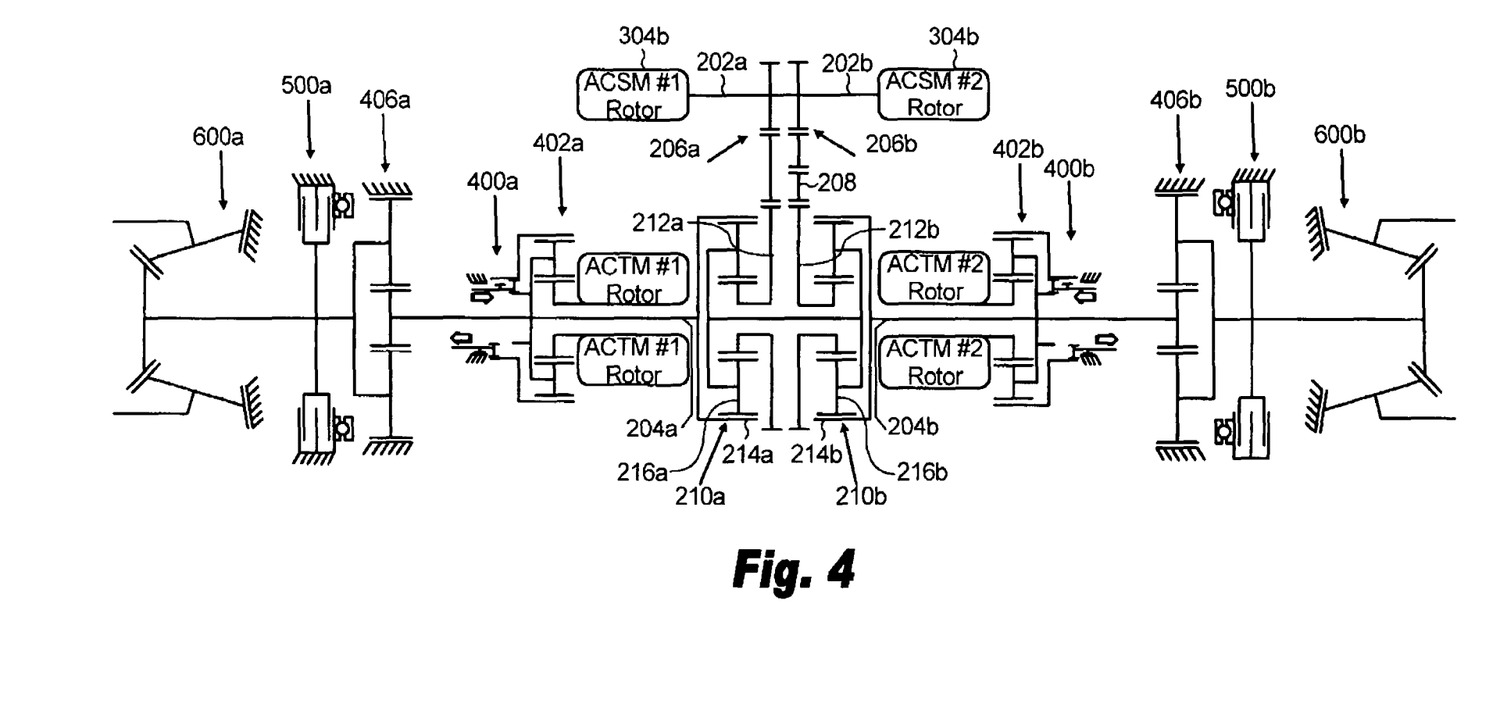
FIG. 4 illustrates a boundary-less gear mesh schematic showing the interface among the subassembly components.
Figure 7:
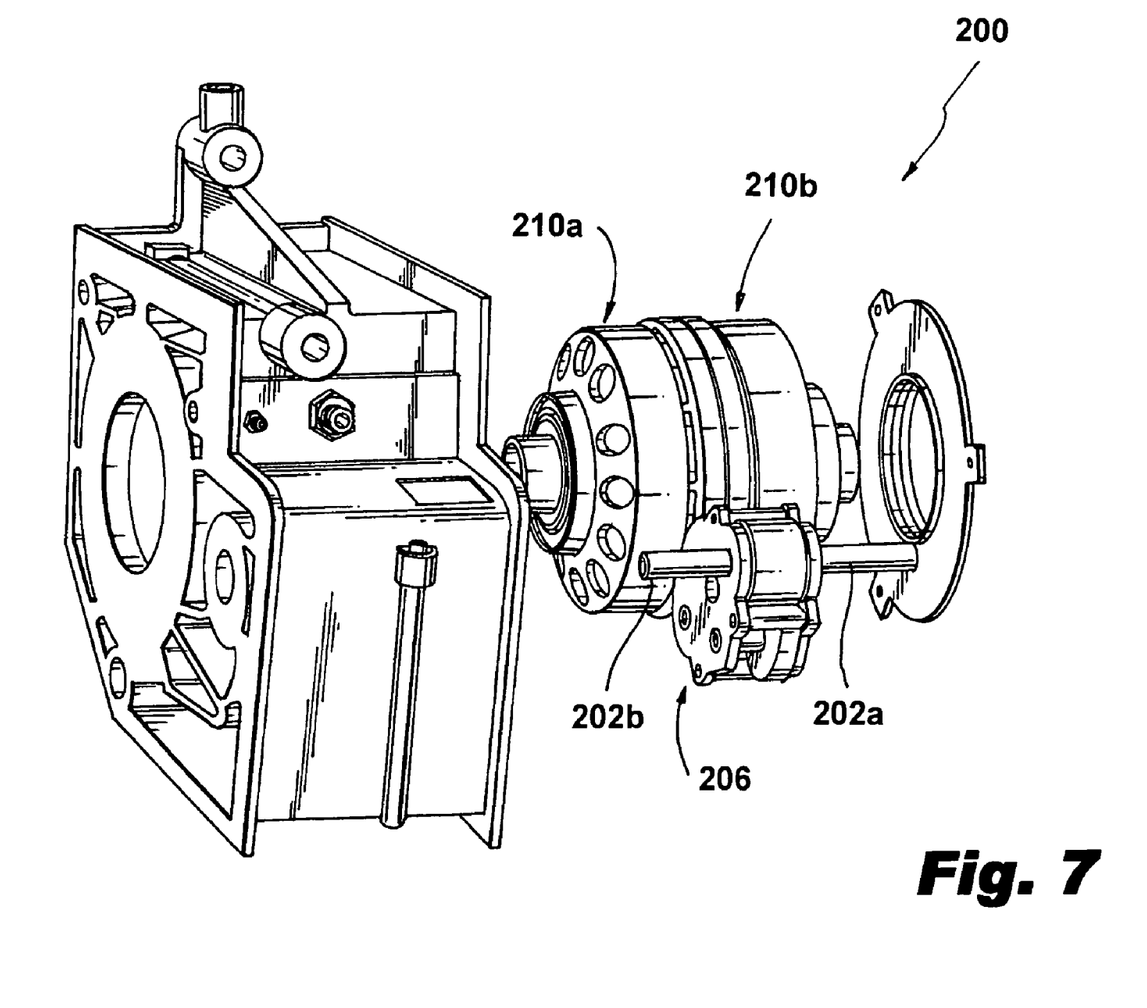
FIG. 7 illustrates an exploded assembly view of Steer Gear Assembly.

Referring now to FIG. 7, illustrated is an exploded assembly view of SGA 200. FIG. 4 illustrates the SGA 200 schematically. The SGA 200 employs planetary gearing to combine the torque and speed inputs of the ACTMs 302 and ACSMs 304 to generate differential output speed and torque at the FDAs 600. Differential speed and torque outputs enable the differential speed steered vehicle to execute a turn of any given radius regardless of speed, limited only by the dynamics of the vehicle suspension.

Figure 4A:
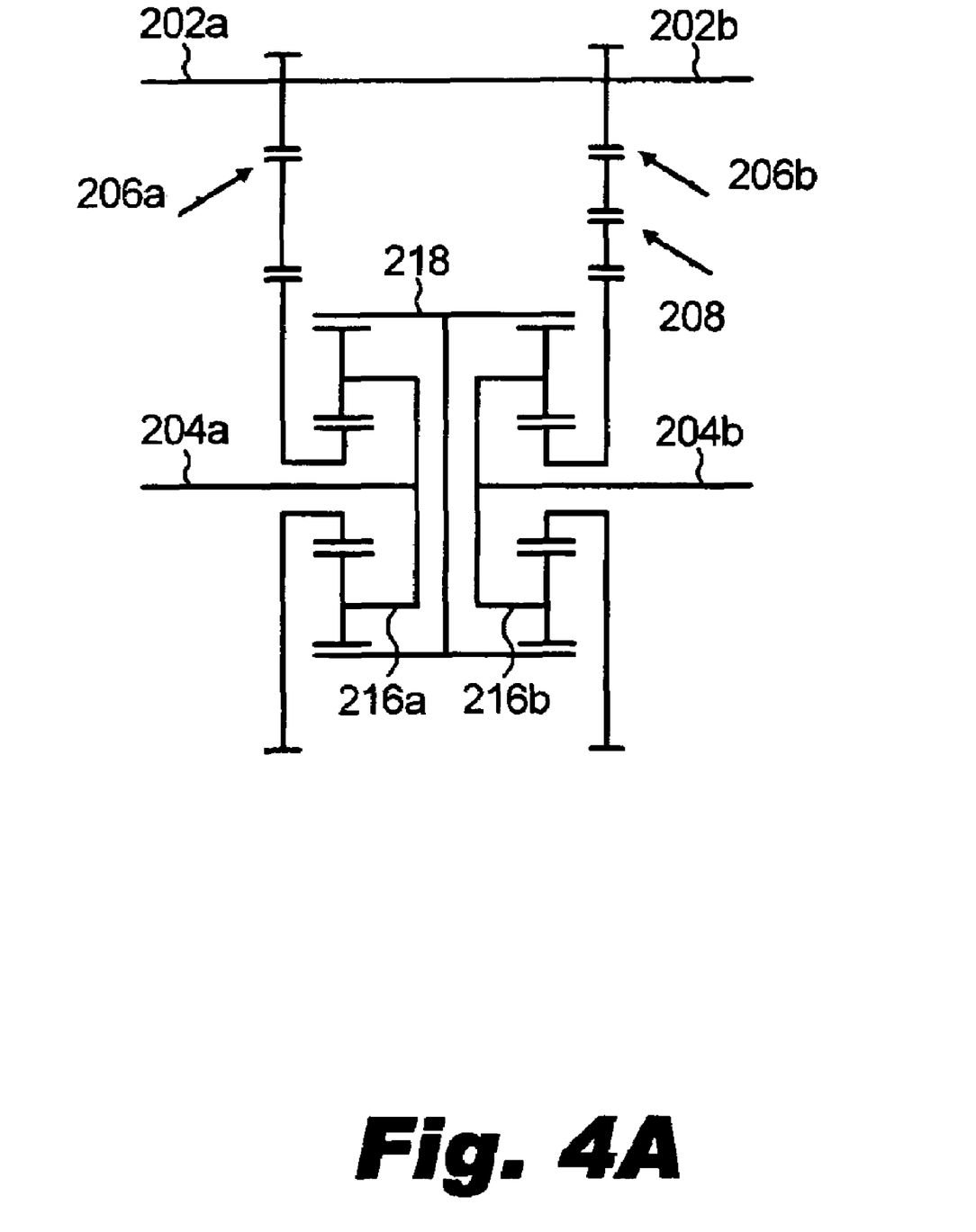
FIG. 4A illustrates an gear mesh schematic diagram for an alternate embodiment of the Steer Gear Assembly.

ACSMs 304 provide input torque to steer motor input shafts 202a, 202b. Steer motor input torque is transferred to the steer gear output shafts 204a, 204b by offset gears 206a, 206b with one offset gear including an additional reversing idler gear 208, which are in turn connected through steering planetary gear sets 210a, 210b. In the embodiment of FIG. 7, the steer motor inputs drive the sun gears 212a, 212b, of respective steering planetary gear sets 210. Further, the ring gears 214a, 214b of respective steering planetary gear sets 210 are connected to steer gear output shafts 204, and left and right carriers 216a, 216b are connected with one another. In an alternate embodiment of a SGA 200, with reference to FIG. 4A, the steer motor input still drives the sun gears 212, however the left and right carriers 216 are connected to one another by a common ring gear 218. One drawback to this arrangement is that the free common ring gear 218 turns at a multiple speed of the output shafts 204, which may be undesirable.

The SGA 200 combines offset and planetary gearing to combine torque of the ACTMs 302 and ACSMs 304 in a way to provide controllable differential output speeds and torques, enabling a differential speed steered vehicle to steer efficiently, safely and reliably.

The architecture of the SGA 200 provides advantages over more conventional outboard or "zero shaft" steering gear architectures. Among these, the compact and centralized SGA 200 reduces weight space and bearings associated with the outboard "zero shaft" architecture by consolidating all steer gearing in a single assembly and enclosure. Additionally, by placing the SGA 200 inboard of the ACTMs 302, i.e., the ATCMs 302 are between the SGA 200 and the FDAs 600, the SGA 200 is not required to react or bear the full driving traction torque, reducing gear loading on the SGA 200. Additionally, the centralized SGA 200 architecture is fault-tolerant. The centralized SGA 200 is not a required reaction element in the traction power train. Therefore, any mechanical failure of the SGA 200 results in a diminished vehicle performance, as opposed to complete incapacitation as would result from a steering gear failure in conventional or "zero shaft" steer gear architecture.

Conventional outboard steering gear implementations are constrained by conventional propulsion systems, which utilized a single power input from the engine or transmission, requiring separate steer gears located on either side of the power input to achieve differential speeds and torques on either side. Unlike mechanical drives, there is no mechanical penalty in the electric drive TDS 10 for splitting the traction power inputs, left and right. The split traction power input facilitates use of a centralized and compact SGA 200, in addition to fault tolerance.

Moreover, there are system benefits to splitting the traction motor inputs. The SGA 200 mechanically couples the left and right side traction drives with ACSM 304 inputs onto a cross-shaft arrangement so that regenerative power can be mechanically transferred from one FDA 600 to the other when turning, similar to conventional steer gear architectures. However, the centralized SGA 200 arrangement of the semi-independent left and right ACTMs 202 straddling the SGA 200 and connected through the cross-shafting, permit the ACTMs 302 to operate in unison with the ACSMs 304 to provide vehicle steering, or the two ACTMs 302 can provide and/or supplement the steering requirements by acting together with, or in the absence of, ACSMs 304. This flexibility in meeting the vehicle steering requirements, and ability for both the ACTMs 302 and ACSMs 304 to supplement or complement each other provides a high level of redundancy, and therefore safety, unique to the TDS 10 of the present invention. As an extreme example, where either or both ACMSs 304 have lost function and/or the SGA 200 has failed mechanically, the ACTMs 302 can still provide full propulsion and limited steering capability. In contrast, a conventional steering gear arrangement would be unable to steer in the absence of a steering motor input, and failure of the steer gearing would result in the loss of both steering and propulsion capability.

Figure 8:
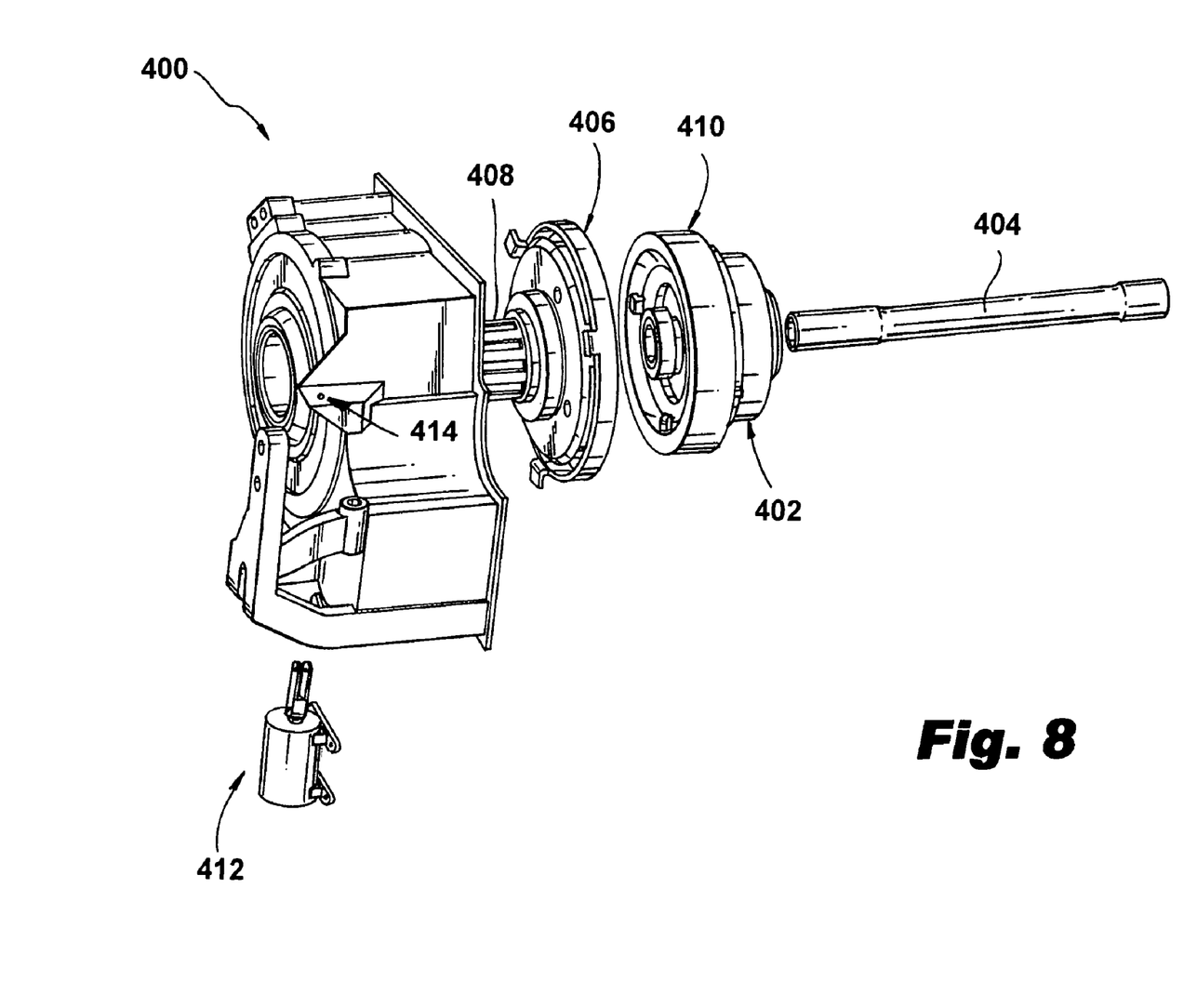
FIG. 8 illustrates an exploded assembly view of a Range Shift Reduction Gear (RSRG) assembly.

Referring now to FIG. 8, illustrated is an exploded assembly view of a RSRG 400. Each of the two RSRGs 400a, 400b provide several functions to the TDS 10. RSRG 400 primarily consists of two components. The first component is a selectable high range, preferably about 1:1, or low range, preferably about 2.85:1, shift-on-the-fly or High/Low Shift (HLS) planetary gear 402. The HLS 402 also preferably includes a decoupled or neutral fault condition position, decoupling the input portion 416 of ACTM 302 from the output ring 418 connected to cross shaft 404 in the event of a hydraulic failure. The HLS 402 connects ACTM 302 to cross-shaft 404. The second component is a fixed ratio High Speed Planetary (HSP) reduction gear 406 that provides output speed and torque to the FDA 600 through a final coupling drive interface 408. Final coupling drive interface 408 preferably includes a misalignment-tolerant driveline coupling.

Figure 9:
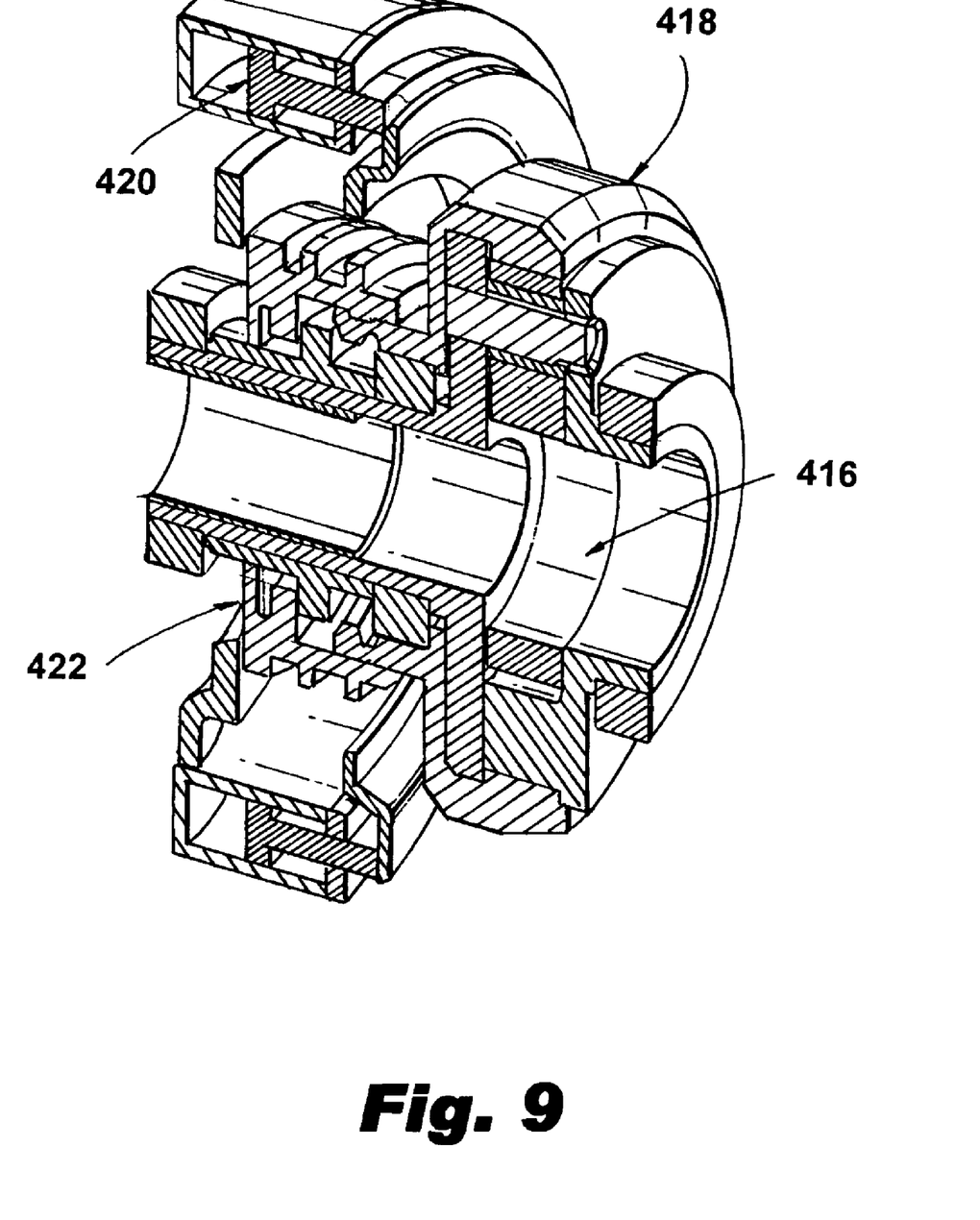
FIG. 9 illustrates a cross sectional view of shift RSRG shift actuator 410.

The RSRG 400 also preferably includes a hydraulic dog-shift actuator 410 and a hydraulic service brake actuator 412. Referring to FIG. 9, illustrated is a cross sectional view of shift RSRG 400 shift actuator 410. The hydraulic dog-shift actuator 410 uses an annular hydraulic piston 420 to mechanically engage a dog/spline arrangement 422 in the HLS 402 to select between high and low gears. The dog/spline engagement eliminates the need for a power-shift friction clutch element, undesirable at the relatively high 12,000 RPM anticipated operation range of the ACTM 302, which eliminates wear of the friction clutch as a potential failure mode. The service brake actuator 412 is a linear hydraulic piston with dual redundant servo valve control, which ensure proper service brake actuation, control and modulation capacity in an operational and faulted modes. As a matter of convenience, RSRG 400 also includes an actuation mount 414 for a manual cable actuation of the emergency/parking brake function.

Also, preferably connected to the HSP 406 is a speed increasing gear, preferably 1.7:1, providing ground-drive power via an overrunning clutch 415 (See FIG. 6), powering a tandem coolant/hydraulic pump 308 for use in the event of a high-voltage system malfunction. This mechanical tandem pump drive ensures hydraulic power for braking remains available even following the loss of high-voltage power, which supplies ACPM 306. Those skilled in the art will appreciate that the complementary RSRG 400 is a mirror image of FIG. 8.

Figure 10:
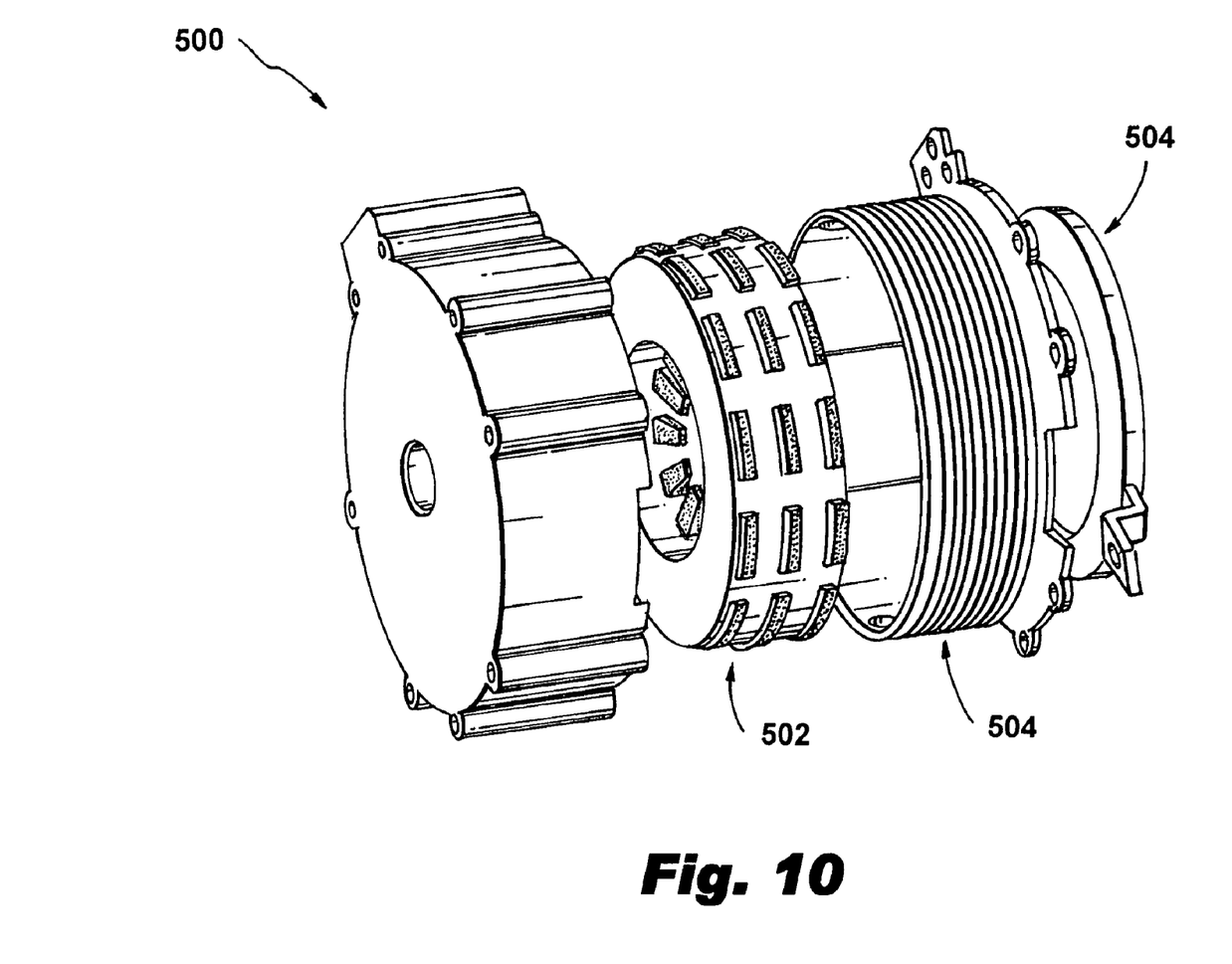
FIG. 10 illustrates an exploded assembly view of a service/parking brake assembly.

Referring now to FIG. 10, illustrated is an exploded assembly view of a service/parking brake assembly 500. SPBA 500 combines the service and parking brake functions into a single integrated module. The SPBA 500 employs multi-disk carbon/carbon friction elements 502, preferably three rotor elements and two stator elements, with separate and independent actuation mechanisms for service brake and parking/emergency brake function. In the TDS 10 according to exemplary embodiments of the present invention, full braking capability is accomplished by the combined effort of the service brake 500 and the electric regenerative braking capacity of the ACTMs 302.

There are three methods of effecting braking in the TDS 10. The primary mode is regenerative braking using only the ACTMs 302, up to a power level of the DC link, in the exemplary embodiment 500 kW. The second braking mode is the electro-hydraulically actuated and modulated service brakes, supplementive of the electric regenerative braking capacity for those braking events that require power dissipations beyond the capability of the regenerative means alone, or in the event of a high-voltage DC link saturation or failure. A tertiary braking mode is operator mechanical actuation, for example through cable pull linkage, for parking/emergency brake function in the event of a total electrical system failure. Because the service and parking brakes use the same friction pack 502, the parking/emergency brake can be actuated at any operational vehicle speed.

Actuation of the brake pack 502 is accomplished using an annular ball ramp 504 driven by one of an electrically modulated hydraulic piston for service braking, or by a cable pull for parking/emergency braking. The hydraulic pressure is supplied by the redundant and fault-tolerant vehicle lube oil (LO) system assembly. The LO system pump cluster is powered by dual independent ACPMs 306 with backup mechanical ground drives through an overrunning clutch 416 in the even of a loss of high voltage. Additional brake system redundancy is provided via an optional 1 liter hydraulic accumulator (not shown). This robust and reliable system arrangement provides service brake actuation and steering capability even following failure or malfunction of the high voltage DC link, without necessitating high current or power draws from the vehicle low-voltage supply.

The combined effort of the carbon/carbon service brakes and the electric regenerative braking give TDS 10 the ability to meet aggressive and repeated vehicle braking requirements. PGW cooling of the brake housing 504 is used to dissipate vehicle kinetic energy absorbed as heat. In preferred embodiments, the regenerative braking alone is sufficient to accomplish the majority of braking events without the use of service braking. This advantageously substantially reduces service brake wear and the associated required maintenance.

The present invention has been described herein with reference to certain exemplary or preferred embodiments. These embodiments are offered as merely illustrative, not limiting, of the scope of the present invention. Certain alterations or modifications may be apparent to those skilled in the art in light of instant disclosure without departing from the spirit or scope of the present invention, which is defined solely with reference to the following appended claims.

The invention claimed is:

1. A transmission drive system for a differential speed steered vehicle, the system comprising:
   first and second AC induction traction motors, each operatively coupled to first and second semi-independent coaxial traction shafts, respectively;
   first and second AC induction steer motors coaxially mounted on a common steer axis parallel to the coaxial traction shafts; and
   a steering gear assembly comprising:
      a common steer input shaft operatively connected to the two AC induction steering motors;
      first and second planetary gear sets, the first and second traction shafts being operatively connected with one of a first and second planet gear carrier, or a first and second ring gear, respectively, of the first and second planetary gear sets, the other of the first and second planet gear carriers or the first and second ring gears being operatively connected with each other;
      first and second offset gears mounted to the steer input shaft and meshing with a first and second sun gear, respectively, of the first and second planetary gear sets; and
      a reversing idler gear interposed between one of the first and second offset gears and one of the first and second sun gears.

2. The transmission drive system according to claim 1, wherein the steering gear assembly is interposed between the two AC induction steer motors and between the two AC induction traction motors.

3. The transmission drive system according to claim 1, wherein the speed steered vehicle is a track-laying vehicle.

4. The transmission drive system according to claim 1, further comprising first and second clutch mechanisms operative to selectively engage the first and second AC induction traction motors with the first and second coaxial traction shafts.

5. The transmission drive system according to claim 4, wherein the first and second clutch mechanisms comprise a neutral fault position that disengages the first or second AC induction traction motors from the first or second coaxial traction shafts.

6. The transmission drive system according to claim 4, wherein the first and second clutch mechanisms are operative to selectively alter a turning speed of the first or second coaxial traction shafts relative to the first or second AC induction traction motors.

7. The transmission drive system according to claim 1, further comprising first an second AC induction pump motors operatively connected to an driving first and second tandem hydraulic pumps.

8. The transmission drive system according to claim 6, wherein said first and second hydraulic pumps are selectively driven by a overrunning clutch driven by motion of the speed steered vehicle.

9. The transmission drive system according to claim 7, wherein said first and second hydraulic pumps circulate oil through the transmission drive system.

10. The transmission drive system according to claim 1, further comprising first and second semi-independent electronics modules, each providing power to and control of the first and second AC induction traction motor and the first and second AC induction steering motors, respectively.

11. The transmission drive system according to claim 9, wherein the first and second semi-independent electronics modules provide dual redundant power and control structure.

12. The transmission drive system according to claim 9, wherein the first and second semi-independent electronics modules further comprise means for conducting regenerative braking by the first and second AC induction traction motors.

13. The transmission drive system according to claim 10, wherein the first and second semi-independent electronics modules provide space vector control of the first and second AC induction traction motor and the first and second AC induction steering motors, respectively.

14. The transmission drive system according to claim 1, further comprising first and second mechanical braking subassemblies.

15. The transmission drive system according to claim 14, wherein the mechanical braking subassemblies are manually actuated.

16. The transmission drive system according to claim 14, wherein the mechanical braking subassemblies are hydraulically actuated.

17. The transmission drive system according to claim 1, wherein the transmission drive system is sealed against the ingress of foreign gas, liquid or particulate.

18. The transmission drive system according to claim 17, wherein the transmission drive system is ported for the interface of electrical power and control signals, coolant liquid and mechanical brake actuation.

19. The transmission drive system according to claim 1, further comprising first and second output couplings for delivering output speed and torque from the transmission drive system.

20. The transmission drive system according to claim 19, wherein the first and second output couplings are tolerant of misalignment.

* * * * *